(12) United States Patent
Smith et al.

(10) Patent No.: US 7,166,032 B2
(45) Date of Patent: Jan. 23, 2007

(54) PASSENGER RESTRAINT SYSTEM

(75) Inventors: John Douglas Smith, Orlando, FL (US); James Burgess, Aliso Viejo, CA (US); Joel Fritsche, Studio City, CA (US); Chris Hellsten, Orlando, FL (US); Tim Kelley, Mt. Vernon, IA (US); Michael Mathaisel, Orlando, FL (US); Mario Scarabino, Kissimmee, FL (US); Dave Wiedman, Orlando, FL (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 10/979,846

(22) Filed: Nov. 1, 2004

(65) Prior Publication Data
US 2005/0145430 A1  Jul. 7, 2005

Related U.S. Application Data

(60) Provisional application No. 60/516,110, filed on Oct. 31, 2003.

(51) Int. Cl.
*A63G 31/00* (2006.01)
(52) U.S. Cl. .............................. 472/59; 472/130; 24/633
(58) Field of Classification Search ............ 472/59–61, 472/130, 137; 434/29, 55; 180/268; 24/633, 24/639, 640, 650, 665
See application file for complete search history.

(56) References Cited

U.S. PATENT DOCUMENTS

| | | | | | |
|---|---|---|---|---|---|
| 3,713,506 | A | * | 1/1973 | Lipschutz | 180/268 |
| 3,912,035 | A | * | 10/1975 | Ulert | 180/268 |
| 3,918,545 | A | * | 11/1975 | Andres et al. | 297/480 |
| 5,182,836 | A | | 2/1993 | Burkat | |
| 5,403,238 | A | * | 4/1995 | Baxter et al. | 472/43 |
| 5,583,844 | A | * | 12/1996 | Wolf et al. | 701/1 |
| 6,829,952 | B1 | * | 12/2004 | Stanley et al. | 73/862.391 |

* cited by examiner

*Primary Examiner*—Kien Nguyen
(74) *Attorney, Agent, or Firm*—Greenberg Traurig, LLP; Pablo E. Tapia, Esq.

(57) ABSTRACT

A passenger restraint system for a vehicle having a plurality of seats, each seat having a seatbelt, a retractor from which the seatbelt is extendable, and a receiver used to latch the seatbelt. Each retractor includes a first pneumatic locking element and a second pneumatic locking element for limiting movement of the seatbelt and each receiver includes a receiver pneumatic locking element for locking the seatbelt within the receiver. A controller controls the operation of a plurality of first valves for supplying air to the first pneumatic locking element of a corresponding one of the plurality of retractors, a second valve for supplying air to each of the second pneumatic locking element of the plurality of retractors, and a plurality of third valves for supplying air to the receiver pneumatic locking element of a corresponding one of the plurality of receivers. Control decisions may be made based upon feedback received from sensors within the receiver that sense a state of the seatbelt with respect to the receiver.

21 Claims, 16 Drawing Sheets

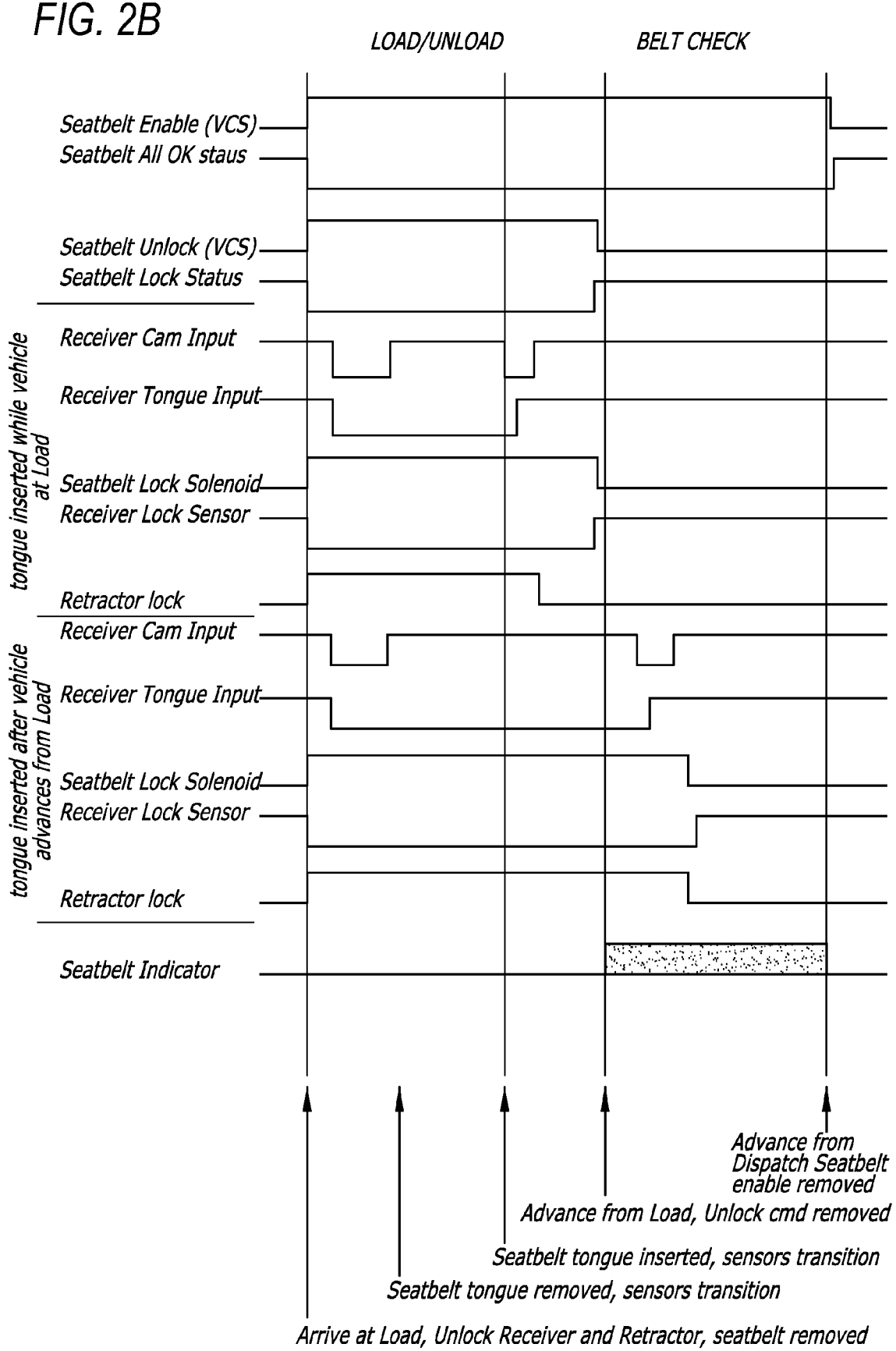

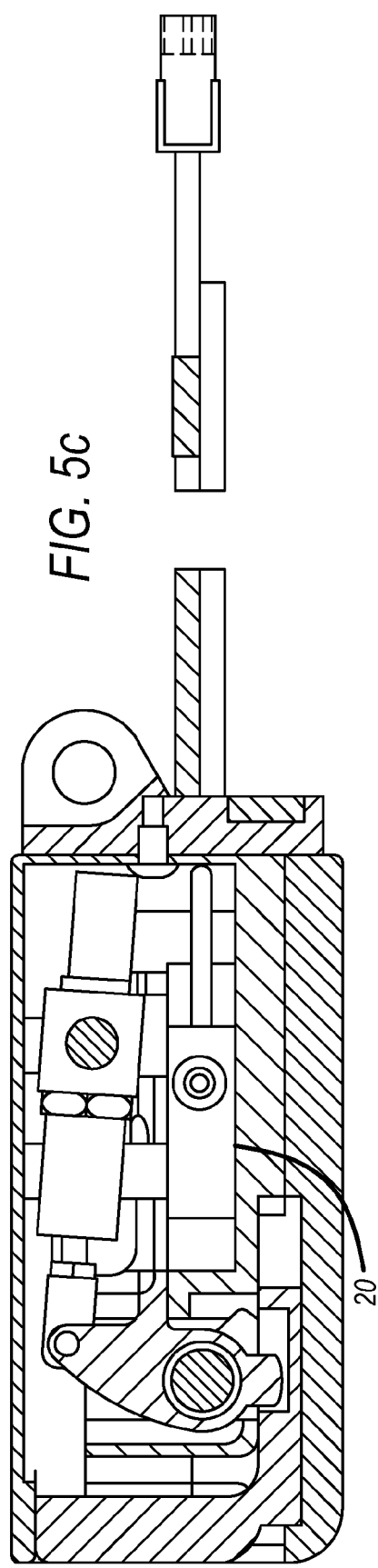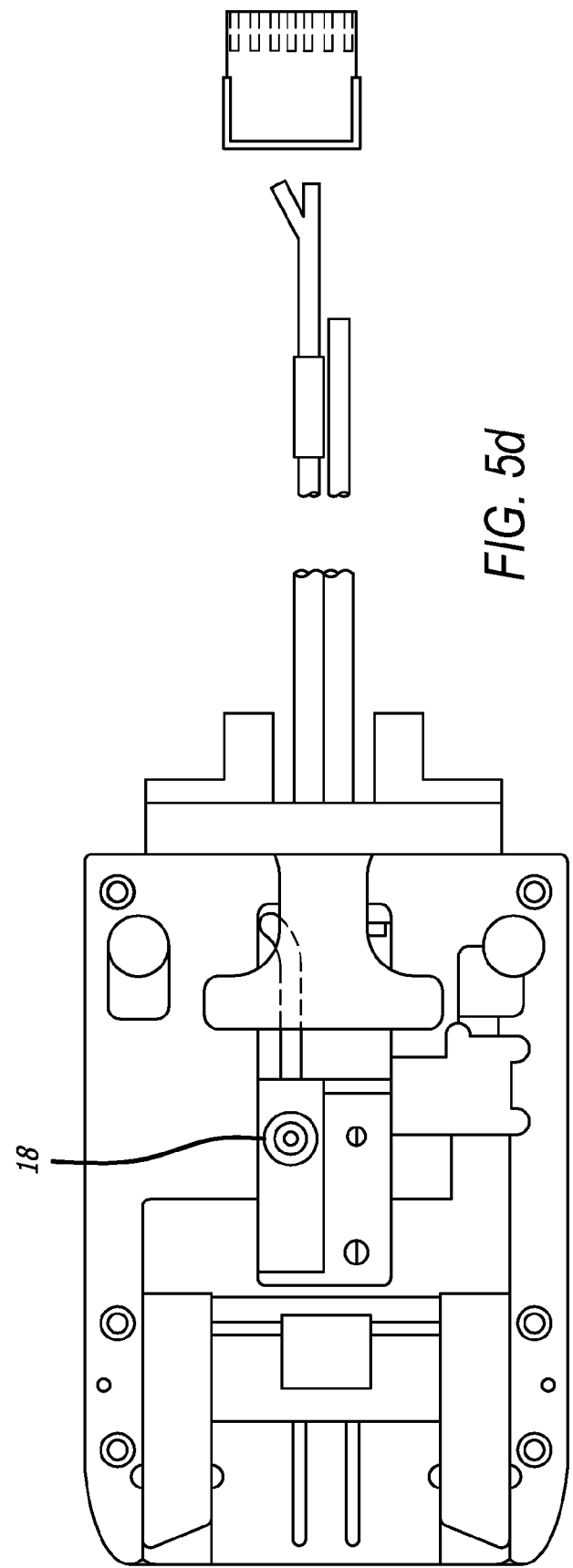

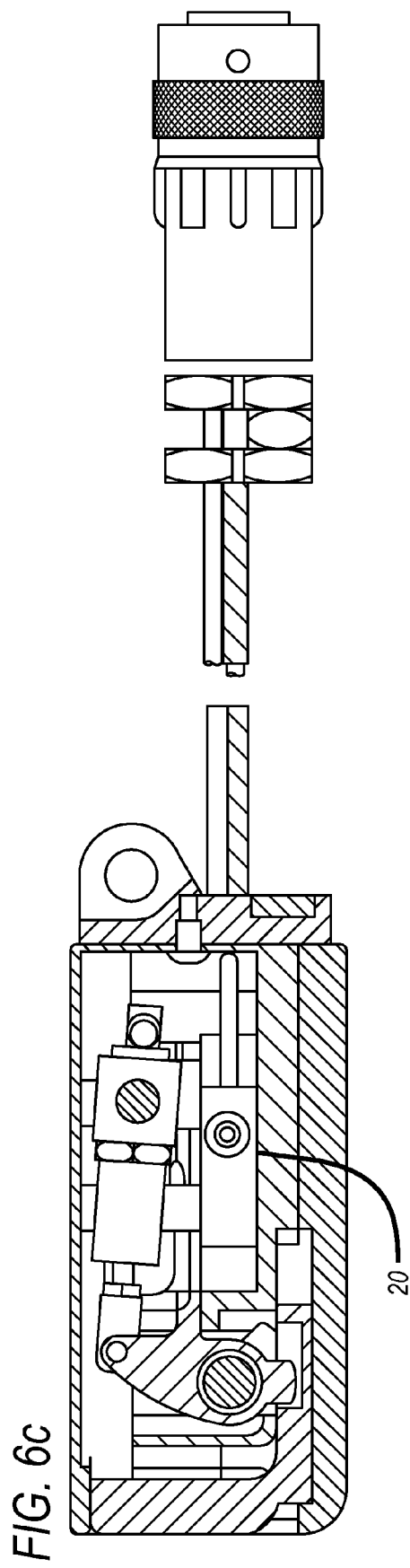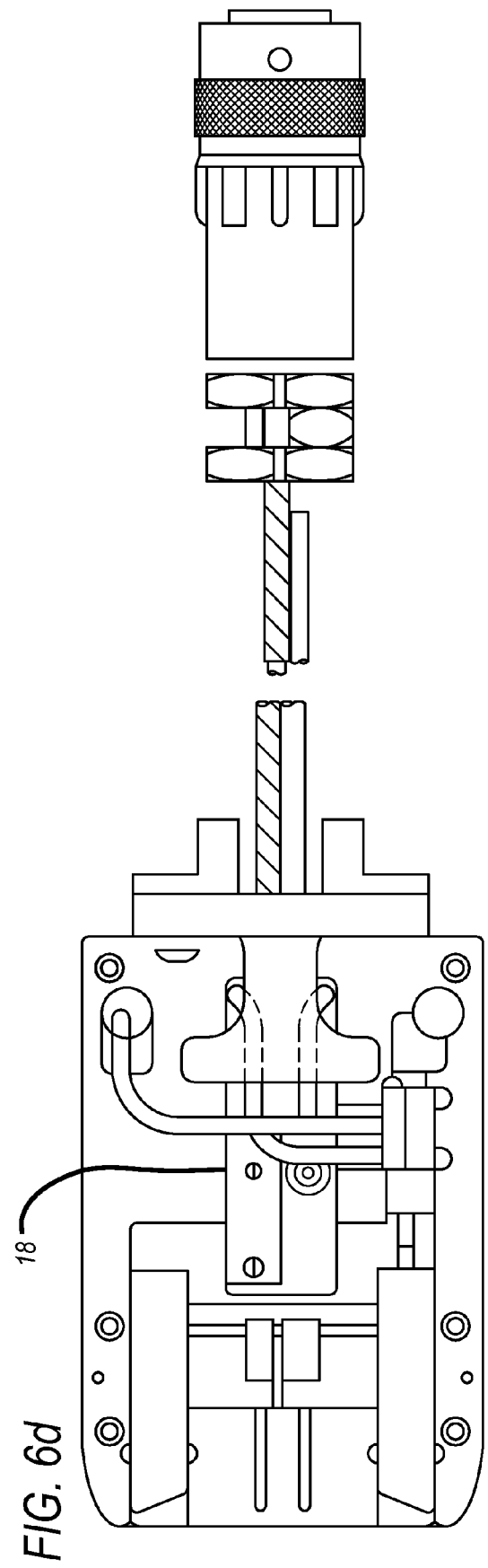
FIG. 6c
FIG. 6d

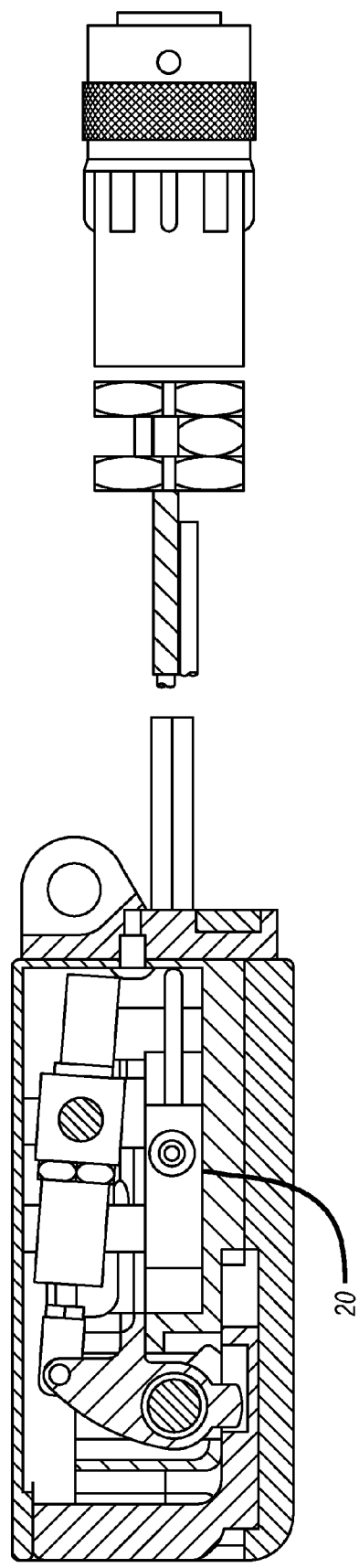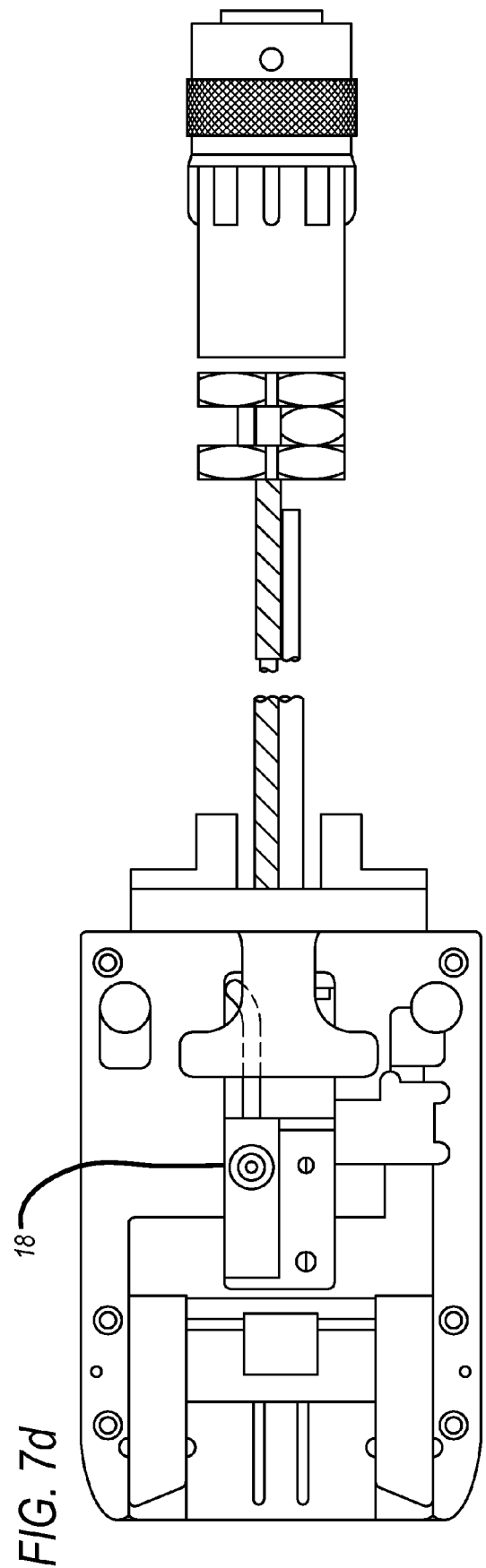
FIG. 7c
FIG. 7d

PASSENGER RESTRAINT SYSTEM

RELATED APPLICATIONS

This application claims priority to U.S. Provisional Application No. 60/516,110 entitled "Passenger Restraint System" filed Oct. 31, 2003, the contents of which are incorporated by reference in their entirety.

BACKGROUND

1. Field of the Invention

The following generally relates to systems and methods for safely restraining passengers, such as passengers of an amusement ride.

2. General Background and State of the Art

In the art, passenger restraint systems are known. For example, commonly assigned U.S. Pat. No. 5,182,836, which is incorporated herein by reference in its entirety, discloses a passenger restraint system including a pressure activated seatbelt locking device that allows an operator to control the locking and unlocking of seatbelts, such as those used on amusement rides, from a remote location. To this end, the described seatbelt locking device has a buckle portion into which a latching tongue is inserted and held by a retractable element which extends though an aperture in the latching tongue. The latching tongue can be removed from the buckle by depressing a release latch to disengage the retractable element from the aperture. The seatbelt locking device is further provided with a pneumatically inflatable air bladder which is exerted against a pivotable lever lock when properly inflated. The inflation of the air bladder causes the lever lock to pivot and bear against the lower end of the release latch, such that the release latch cannot be depressed by the user of the seatbelt to disengage the retractable element from the latching tongue. Accordingly, the seatbelt is retained in the locked position until the air bladder is deflated such that the lever lock pivots away from the release latch.

While such a passenger restraint system does work well for its intended purpose, a need does exist for an improved passenger restraint system, in particular, a passenger restraint system that, among other things, ensures that under any single-point failure the passenger restraint system seatbelt will not automatically disengage at an undesired time and/or which inhibits or restricts vehicle motion if a failure is detected in the passenger restraint system to thereby allow for an appropriate response. A need also exists for an improved passenger restraint system that allows for the use of the same components in multiple locations to, for example, reduce costs associated with spare parts inventory, training maintenance technicians, etc.

SUMMARY

The following describes a passenger restraint system having in one embodiment, one or more seatbelts comprised of a retractor, used to adjust or tighten the seatbelt, and a receiver, used to engage, latch, and lock the seatbelt. In this regard, a latched seatbelt is one wherein the seatbelt receiver has fully engaged a tongue with a cam such that the tongue cannot be physically removed without depressing a release button (i.e., the tongue is fully inserted and the cam is fully extended and engaged through the tongue) and a locked seatbelt is one that cannot be manually unlatched through use of the release button. The seatbelts may also be arranged and configured to provide redundancy in the mechanism used to lock the seatbelt.

For use in monitoring the status of the seatbelts, the passenger restraint system may also be provided with a feedback control system comprised of one or more sensors. The sensors may then be monitored to determine the status of individual seatbelts (e.g., latched, locked). The feedback control system may also provide clear indication to an operator, for example of an amusement ride, that an individual seatbelt has been properly engaged/latched (e.g., by means of a fast blinking status indicator), failed (e.g., by means of a slow blinking status indicator), or disengaged/unlatched (e.g., by means of no status indicator blinking). Still further, the sensors may be utilized to provide status that allows the system to intelligently control the pneumatic locking and unlocking of seatbelt components.

A better understanding of the various objects, advantages, features, properties, and relationships of the passenger restraint system will become apparent from the following detailed description and accompanying drawings which set forth illustrative examples which are indicative of the various ways in which the principles of the passenger restraint system may be employed.

BRIEF DESCRIPTION OF THE DRAWINGS

Exemplary passenger restraint systems are described hereinafter with reference to the following drawings in which:

FIGS. 5a–5d illustrate an exemplary embodiment of a receiver having a single lock pawl assembly in accordance with the present disclosure:

FIGS. 6a–6d illustrate an exemplary embodiment of a receiver having a dual lock pawl assembly in accordance with the present disclosure;

FIGS. 7a–7d illustrate an exemplary embodiment of a receiver having a dual lock pawl assembly in accordance with the present disclosure.

DETAILED DESCRIPTION

Figure 1:
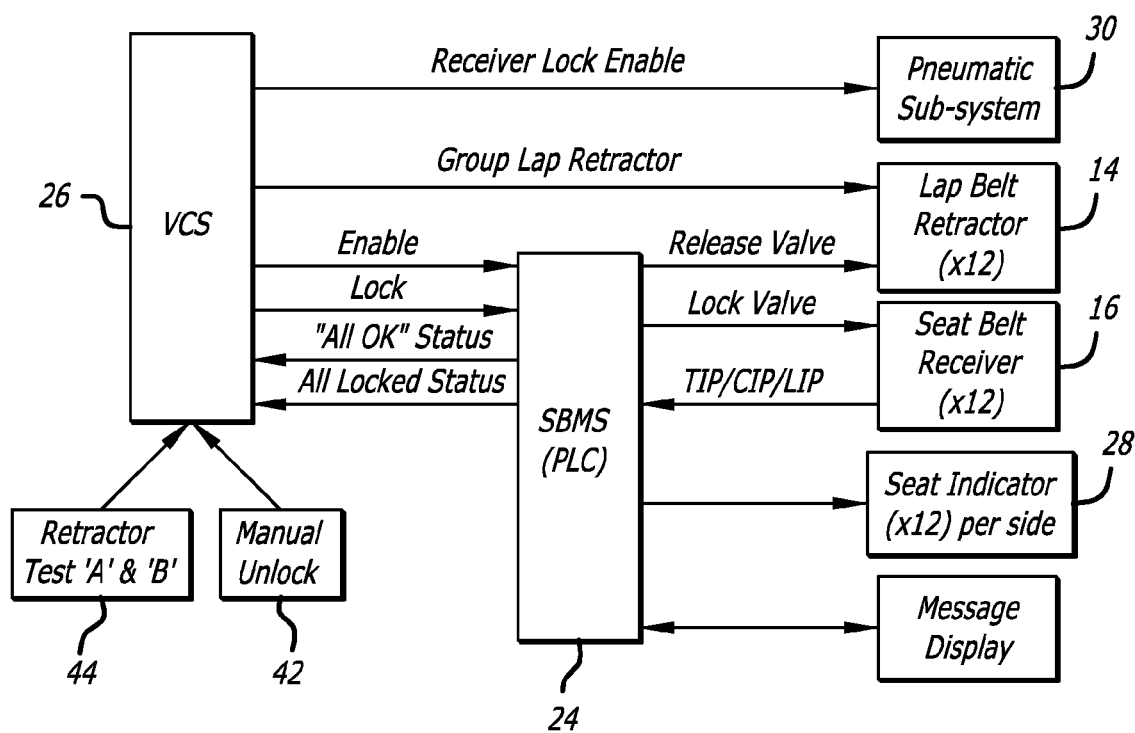
FIG. 1 is a block diagram illustrating an exemplary passenger restraint system.

With reference to the figures, the following describes exemplary passenger restraint systems. In this regard, the passenger restraint systems may be utilized in connection with a vehicle, such as found in an amusement ride, wherein each seat in the ride, which will be occupied by a guest, is fitted with several seatbelt components provided to restrain a guest within the seat. Generally, the seatbelt components include a seat belt (including a belt web 10 and a tongue 12 having an aperture), a lockable belt retractor reel 14 (illustrated by way of example in FIGS. 3a–3e and 4a–4e), a lockable latching seatbelt receiver 16 (illustrated by way of example in FIGS. 5a–5d, 6a–6d and 7a–7d, and pneumatic valves for each receiver and retractor. Each receiver 16 may be further provided with three types of proximity sensors, namely, a tongue in place ("TIP") sensor 18, a cam in place ("CIP") sensor 20, and a lock in place ("LIP") sensor 22. As illustrated in FIG. 1, the various sensors provide information to a seatbelt monitoring system ("SBMS") 24 which may be embodied in an on-vehicle, programmable logic controller ("PLC") that provides supplementary monitoring and redundant control of certain seatbelt functions. In turn, the SBMS is in communication with a vehicle control system ("VCS") 26 that provides on-board control for various vehicle functions. As will be described hereinafter, the SBMS 24 and the VCS 26, each of which includes executable instructions on a readable media for the purpose, among others, of receiving, processing, and generating signals, cooperate to monitor and control the seatbelt components to thereby lock and unlock the receiver 16 and retractor 14. In particular, the SBMS 24 monitors the state and sequence of the receiver sensors and indicates valid and faulted conditions via status signals to the VCS 26. The VCS 26 and the SBMS 24 thus cooperate to issue control signals for locking and unlocking the seatbelts. In addition, the SBMS 24 may cause the state of the seatbelt to be displayed to a ride operator by means of status indicators 28, for example located on an operators display panel ("ODP"). Preferably, each seatbelt would have a corresponding status indicator on the ODP and, therefore, each status indicator may be used to indicate the state of its corresponding seatbelt as being, for example, one of the following: not buckled; buckled and no faults; or buckled and sensor or lock fault. The use of the ODP is advantageous since the SBMS 24 itself is unable to detect the presence of a guest in a seat and, as such, the ride operator can inspect the ODP to ensure that each status indicator 28 indicates a valid "latched-and-locked" state before dispatching the vehicle onto the ride, regardless of whether or not the seat is physically occupied by a guest. In addition, the VCS 26 may be programmed to prevent a ride operator from initiating vehicle motion, for example from a station belt check position, until the SBMS 24 indicates that no faults exist on any seats.

For operating the locking mechanisms of the receivers 16 and retractors 14, the passenger restraint system includes a pneumatic sub-system 30 that functions to provide pressurized air to the locking mechanisms of receivers 16 and retractors 14. In this regard, each lap belt retractor 14 may contain two separately controlled locking pawl assemblies 32, e.g., comprised of a pin, pawl, lock, and reel, that are pneumatically actuated. In the illustrated examples, one locking pawl assembly 32 is positioned on each of the left and right hand sides of a spring loaded reel shaft 34 having an aperture through which passes the belt web 10, thus providing redundant locking pawl assemblies 32 that create redundant load paths. Air is required to release each pawl and the retractor 14 is unlocked when both pawls are released, thus allowing the belt to be extended through the aperture in the reel shaft 34. The air supplied to one side of the retractor 14, i.e., one locking pawl assembly 32, is controlled by the SBMS 24 via an individual lap belt retractor valve—each retractor 14 in the vehicle has a corresponding individual lap belt retractor valve. The air supplied to the other side of the retractor, i.e., the other locking pawl assembly 32, is controlled by the VCS 26 via a group lap belt retractor valve—there is one group lap belt retractor valve in the vehicle that supplies air to all of the retractors 14. All lap belt retractor valves within a vehicle are normally closed. Thus, in the absence of power, the retractor reel 34 will be locked to prevent the seat belt from being extended. The spring-loaded retractor reel 34 is provided to maintain tension on the seat belt web at all times. Furthermore, one or more optional proximity sensors 36 may be provided to provide additional retractor status information to the SBMS/VCS systems.

Similarly, each receiver contains a pneumatic locking mechanism 38, e.g., comprising a pawl, lock, and latch. For example. FIGS. 5*a*–5*d* illustrate an exemplary embodiment of a receiver having a single lock bawl assembly. FIGS. 6*a*–6*d* and 7*a*–7*d* illustrate exemplary embodiments of a receiver having a dual lock pawl assembly in accordance with the present disclosure. When actuated, the locking mechanism 38 prevents a release button 40 from being pressed, thus preventing the tongue 12 of the seat belt from being disengaged. Air is utilized to lock the receiver 16. The air supply to each receiver 16 is controlled by the SBMS 24 via a corresponding individual receiver lock valve—each receiver 16 in the vehicle has a corresponding individual receiver lock valve. The individual receiver lock valves are normally open. However, in the absence of power, the receiver 16 would be unlocked because an upstream supply valve, the solenoid valve, would be closed.

Pressurized air utilized to operate the locking mechanisms of all receivers 16 and retractors 14 is supplied from a compressed air system. In particular, air is supplied to the receiver and retractor legs of the system through a pressure regulator and the solenoid valve. The solenoid valve is turned on, i.e., opened, by the VCS 26 to enable the receiver locking and retractor unlocking. The solenoid valve is turned off, i.e., closed, by the VCS, Vehicle E-Stop, or loss of power. When the solenoid valve is closed, all receivers 16 become unlocked and all retractors 14 become locked. Pressure within the system may be monitored by a seat belt low air pressure switch, with the status being provided to the SBMS/VCS systems. In particular, the pressure switch detects the air pressure at the output of the main air valve and may be set to detect the minimum pressure required to validate correct valve operation.

In operation, after loading a vehicle, guests are generally required to insert the seat belt tongue 12, which is attached by the belt web 10 to the spring-loaded reel 34, into the associated seat belt receiver, 16. When unloading, the guests depress the spring-loaded release button 40 of the receiver 16 to unlatch the tongue 12 from the receiver 16 to free themselves from the passenger restraint system. Meanwhile, ride operators receive from the system indications of the status of each seat belt, and have the ability to manually override the automatic operation of the system, described hereinafter, to lock and unlock the receivers 16. Thus, ride operators may use the system to verify that all seats identified by the system as being properly latched and locked are not occupied by a guest.

With respect to the automatic locking and locking of the various restraint components (e.g., the receivers 16 and retractors 14), the system is responsive to signals provided by the SBMS/VCS. More particular, the signals may be generated by the SBMS/VCS considering feedback from the sensors and/or the position of the vehicle within the ride. For example, the SBMS 24 may generate a signal to automatically lock the retractor 14 whenever the corresponding tongue sensor detects a tongue 12 in the receiver 16. Similarly, when the VCS 26 removes a seatbelt enable signal, the SBMS 24 may generate a signal to lock all retractors 14 and the VCS 26 may generate a signal to close the group lap retractor release valve, thus locking both sides of the retractor 14. Still further, the lap belt retractor locks may be unlocked when the VCS seatbelt enable signal is on and the VCS Seatbelt lock signal is off in which case the VCS 26 energizes (i.e., opens) the group lap belt retractor release valve and, as each belt is sensed to be unlatched from the receiver, the SBMS 24 may send a signal to energize (i.e., open) the corresponding individual lap belt retractor release valve thereby allowing the seatbelt to be retracted.

By way of more specific example and with reference to FIG. 2, an illustrative sequence of events for the system will be described. In this example, it is to be understood that the retractor locks 32 are locked and unlocked when the following conditions occur:

1) The VCS seatbelt lock signal is on—as each belt is latched into the receiver 16, the SBMS 24 sends a signal to close the corresponding individual lap belt retractor release valve; or 2) The VCS seatbelt enable signal is off—the VCS 26 sends a signal to close the group lap belt retractor release valve and the SBMS 24 sends a signal to close all individual lap belt retractor release valves.

It is also to be understood that the receiver lock 38 is unlocked when the following conditions occur:

1) The VCS seatbelt enable signal is on and the VCS seatbelt lock signal is off—the VCS 26 sends a signal to close the solenoid valve and the SBMS 24 sends a signal to close all individual receiver lock valves.

Finally, it is to be understood that the receiver lock 38 is locked when the following conditions occur:

1) The VCS seatbelt lock signal is on—the VCS 26 energizes (i.e., opens) the solenoid valve, the SBMS 24 monitor the transition of the TIP and CIP sensors, and, as each receiver is latched, the SBMS 24 sends a signal to open the corresponding individual receiver lock valve; or 2) The VCS seatbelt enable signal is off—the SBMS 24 sends a signal to de-energize (i.e., open) all individual receiver lock valves.

The seatbelt enable command is provided by the VCS 26 to the SBMS 24 and the SBMS 24 monitors this signal to begin the seatbelt cycle check, e.g., when the signal transitions from low to high. When the signal is inactive (i.e., low), the SMBS 24 turns off all outputs to seat indicators 28, retractor locks 38, and receiver locks 32, as described below.

Figure 2A:
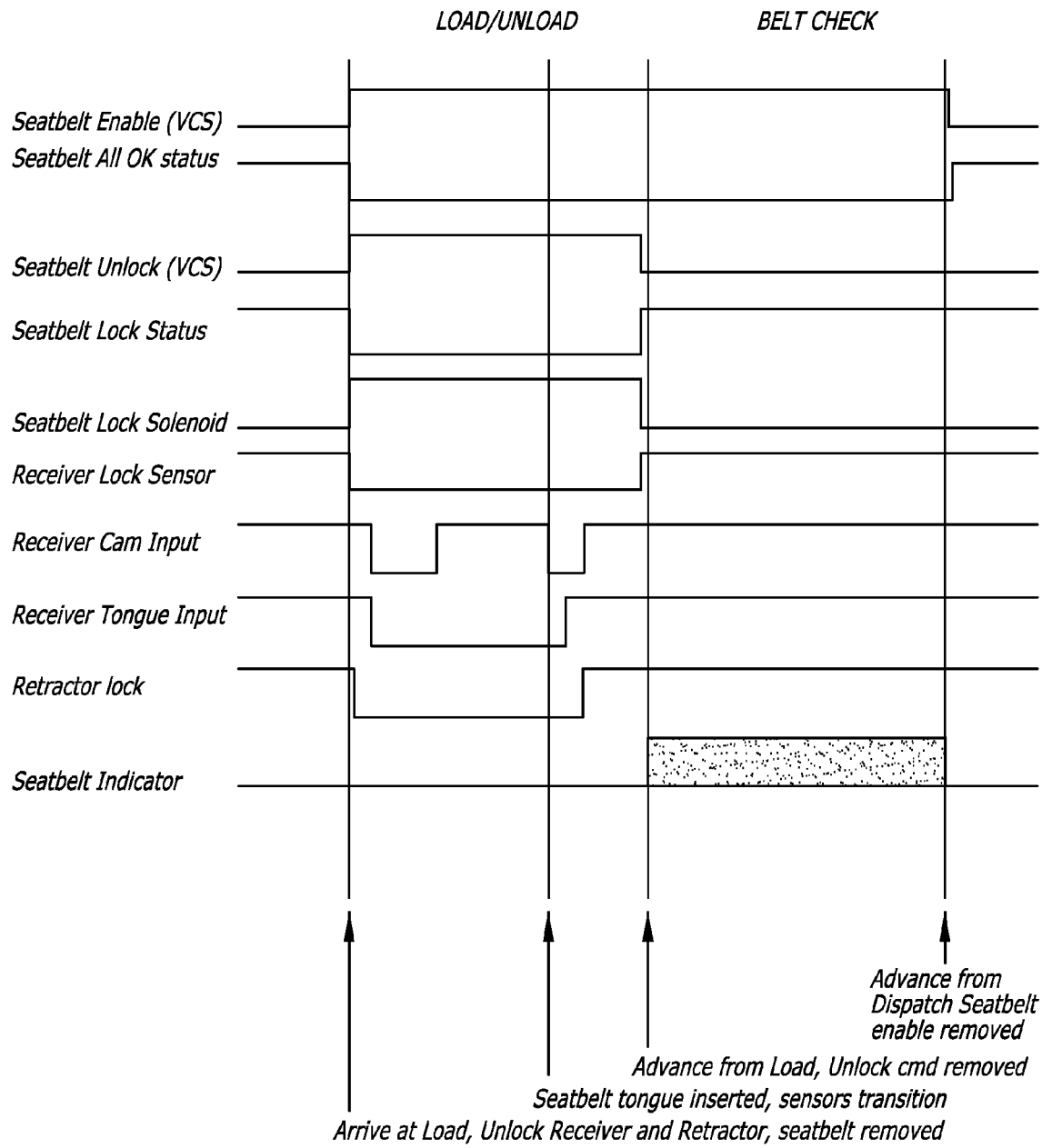
FIG. 2 is a timing diagram illustrating exemplary signals utilized in connection with the passenger restraint system of FIG. 1.
Figure 3A:
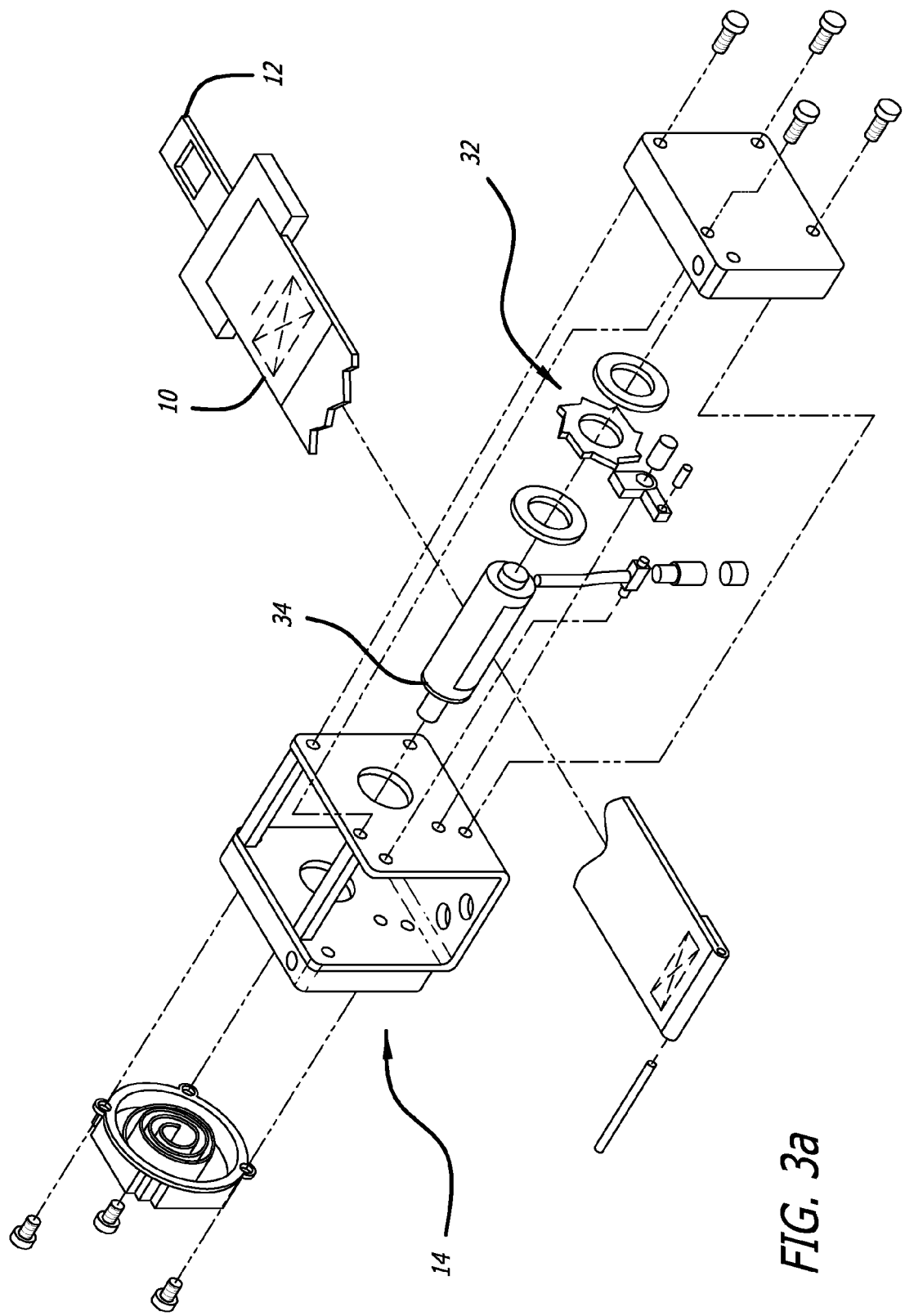
FIGS. 3a–3e illustrate an exemplary embodiment of a retractor without a sensor in accordance with the present disclosure.
Figure 3B:
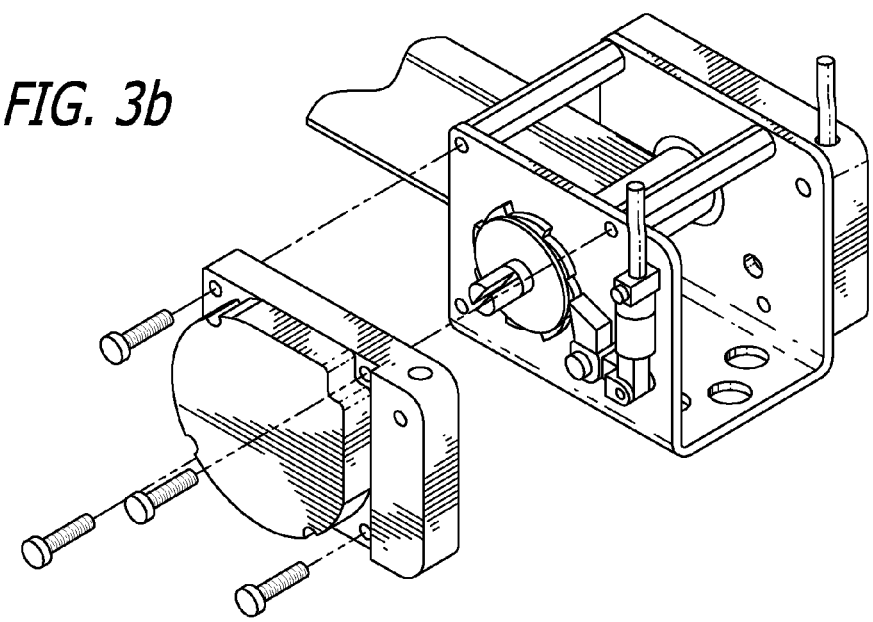
Figure 3C:
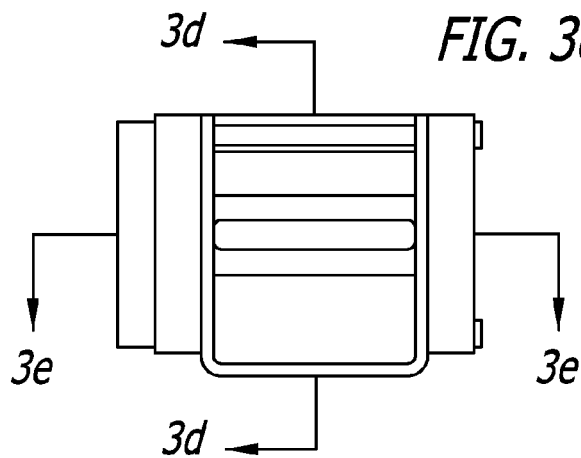
Figure 3D:
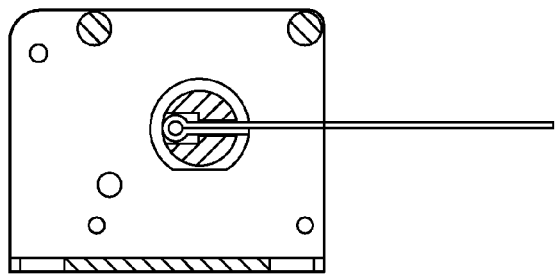
Figure 3E:
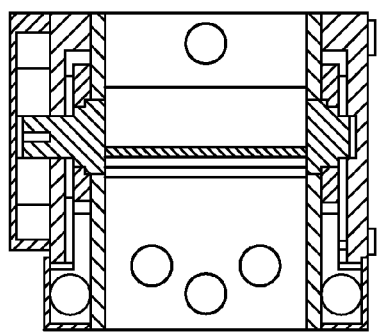
Figure 4A:
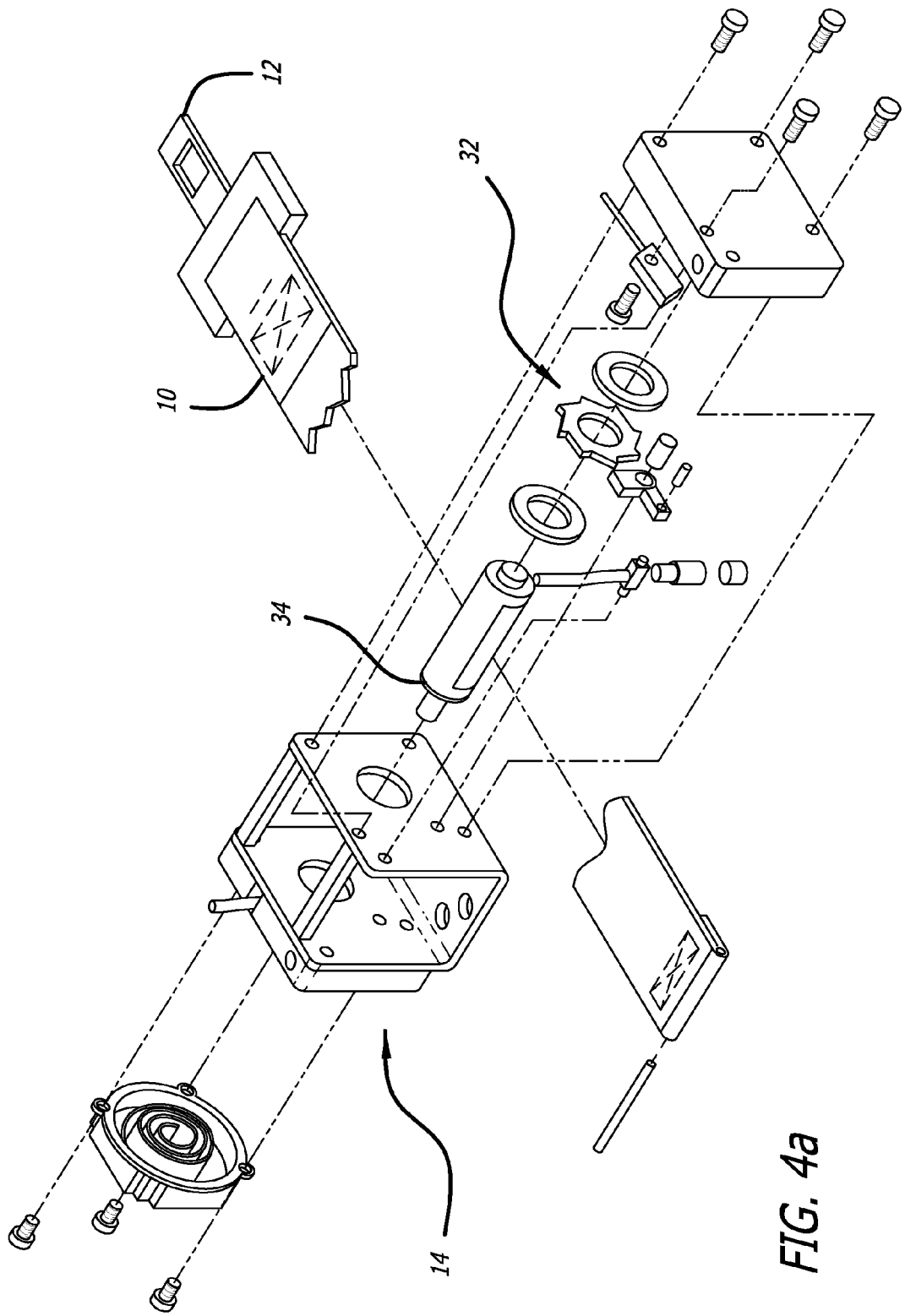
FIGS. 4a–4e illustrate an exemplary embodiment of a retractor with a sensor in accordance with the present disclosure.
Figure 4B:
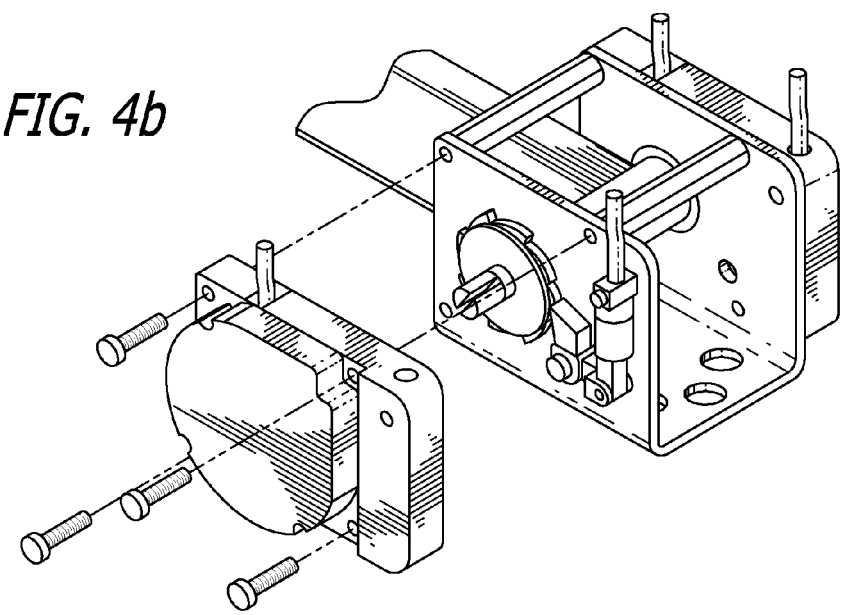
Figure 4C:
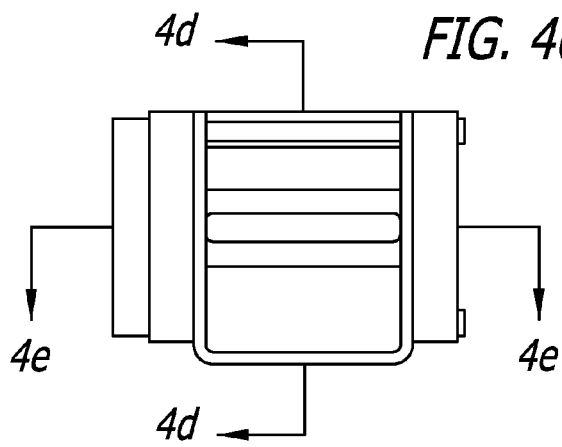
Figure 4D:
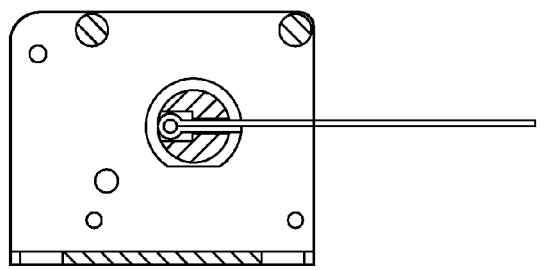
Figure 4E:
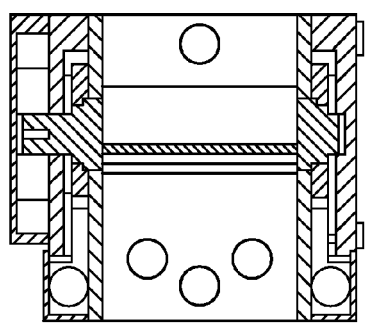
Figure 5A:
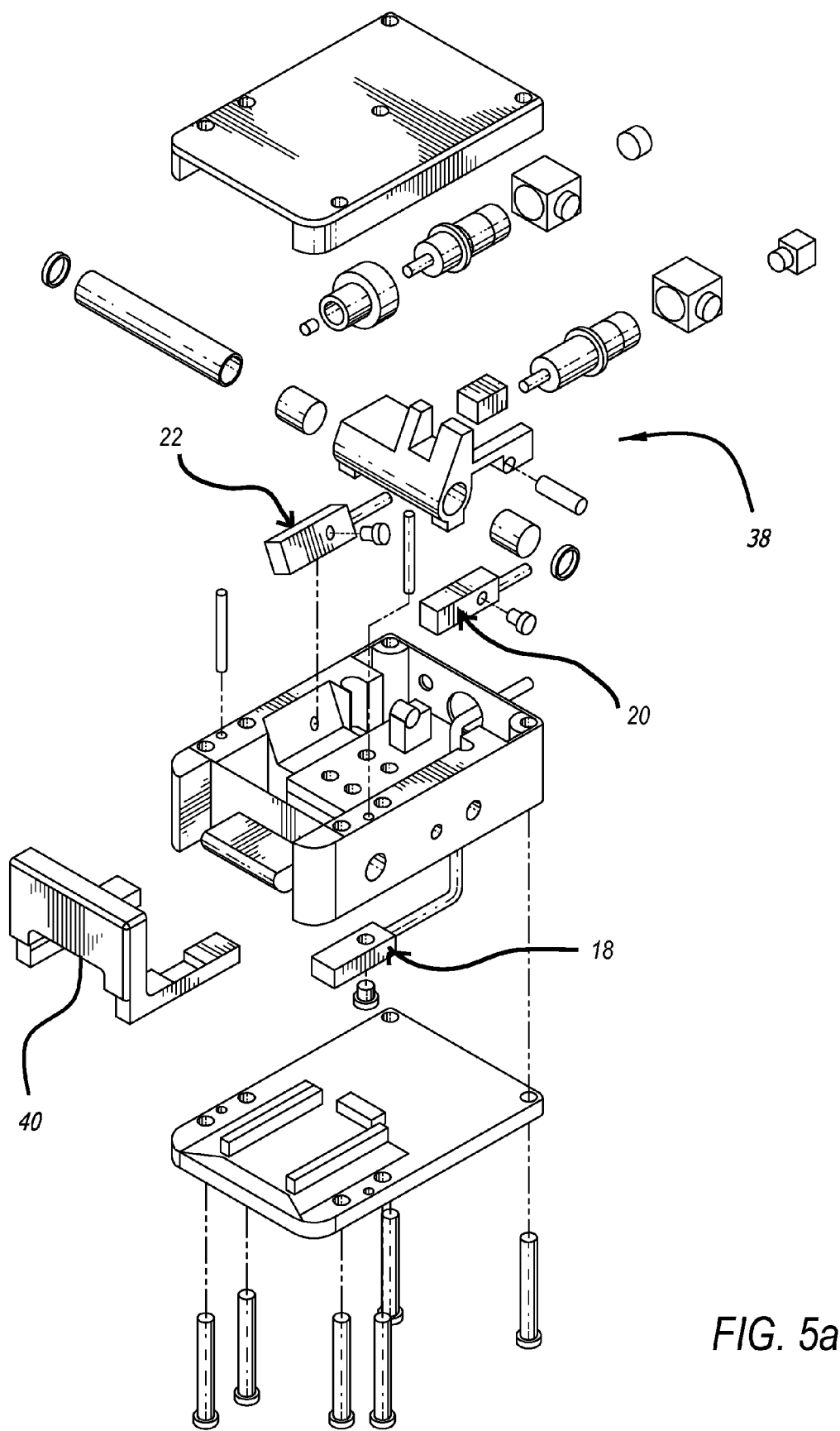
Figure 5B:
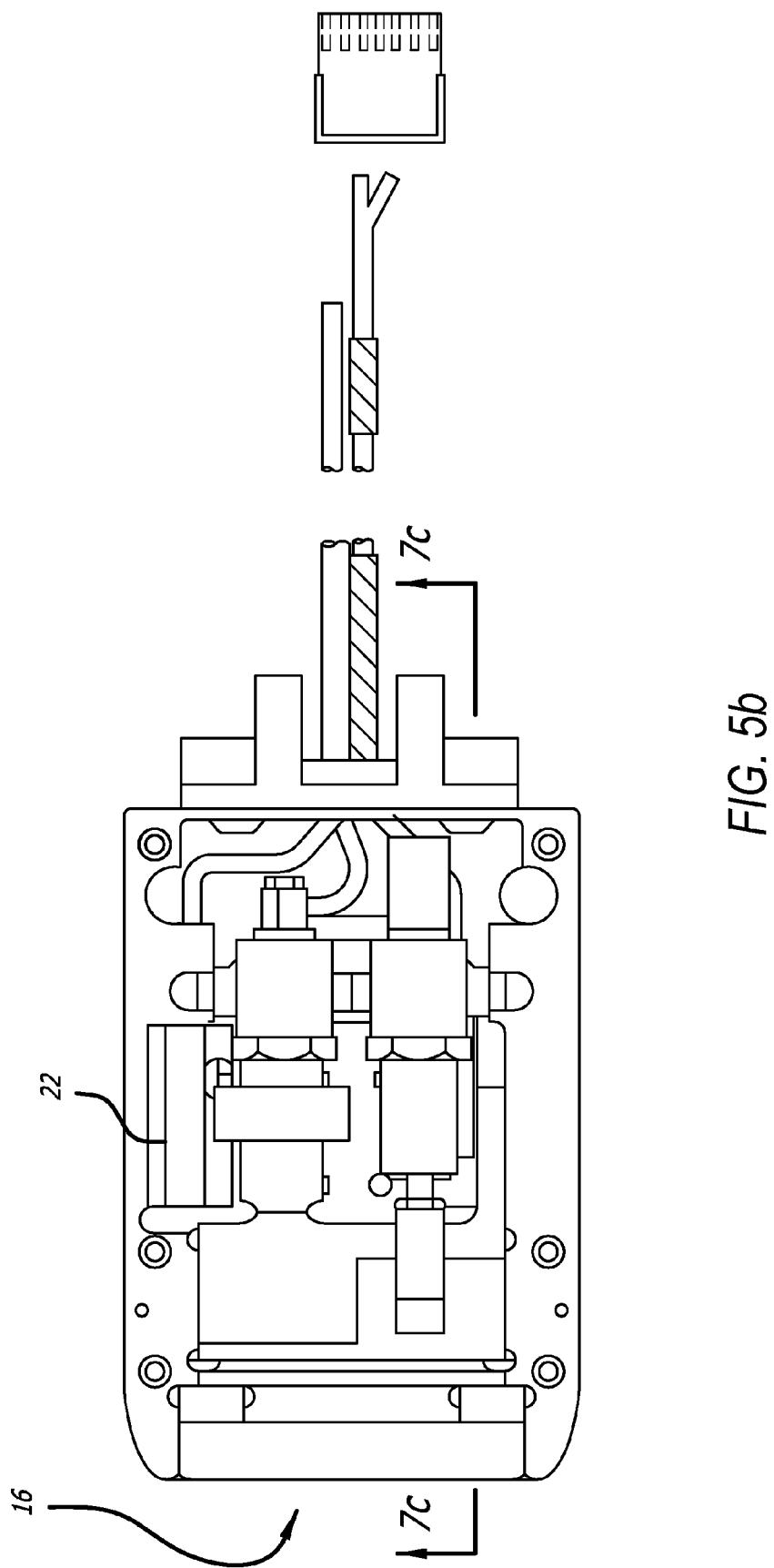
Figure 6A:
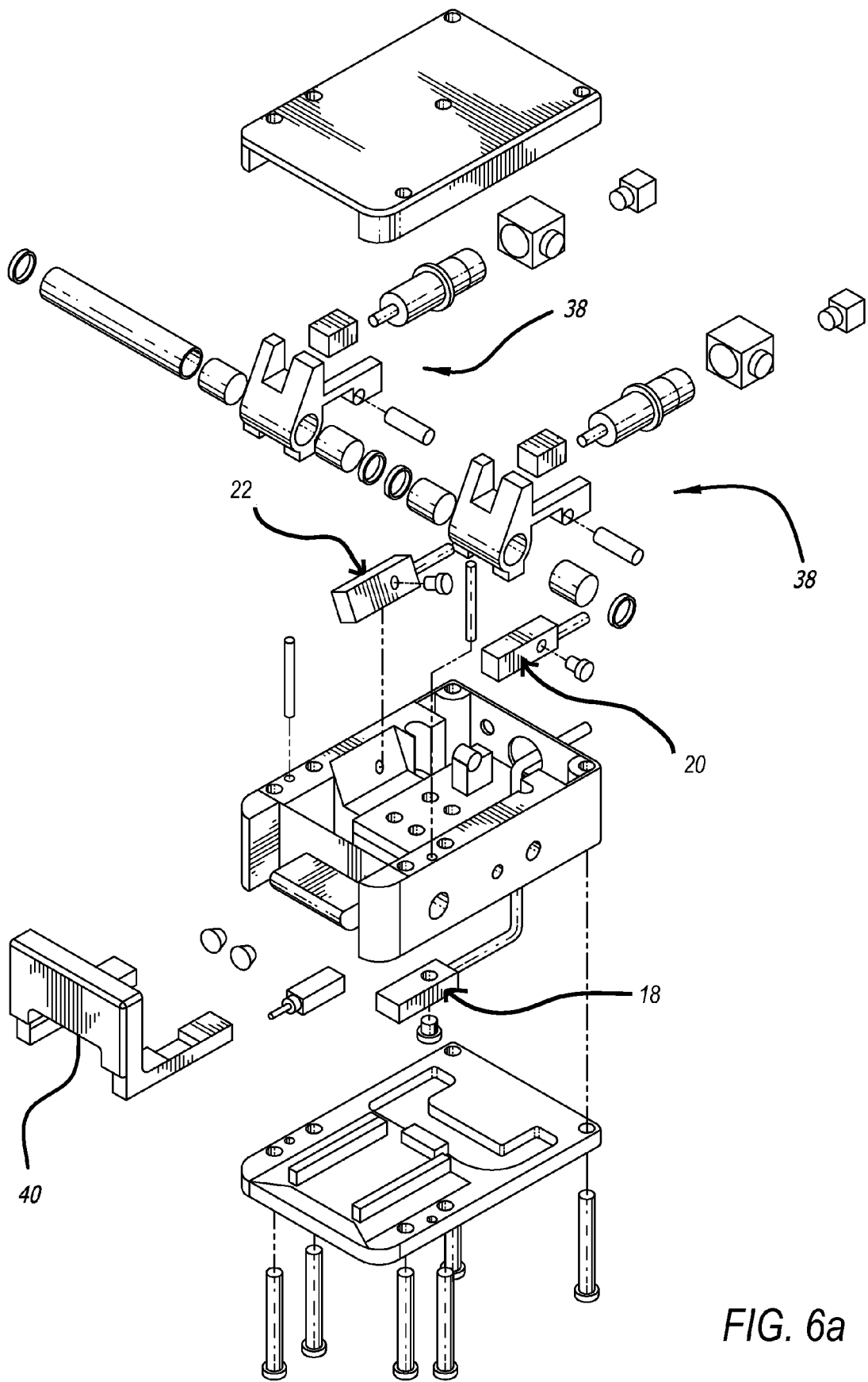
Figure 6B:
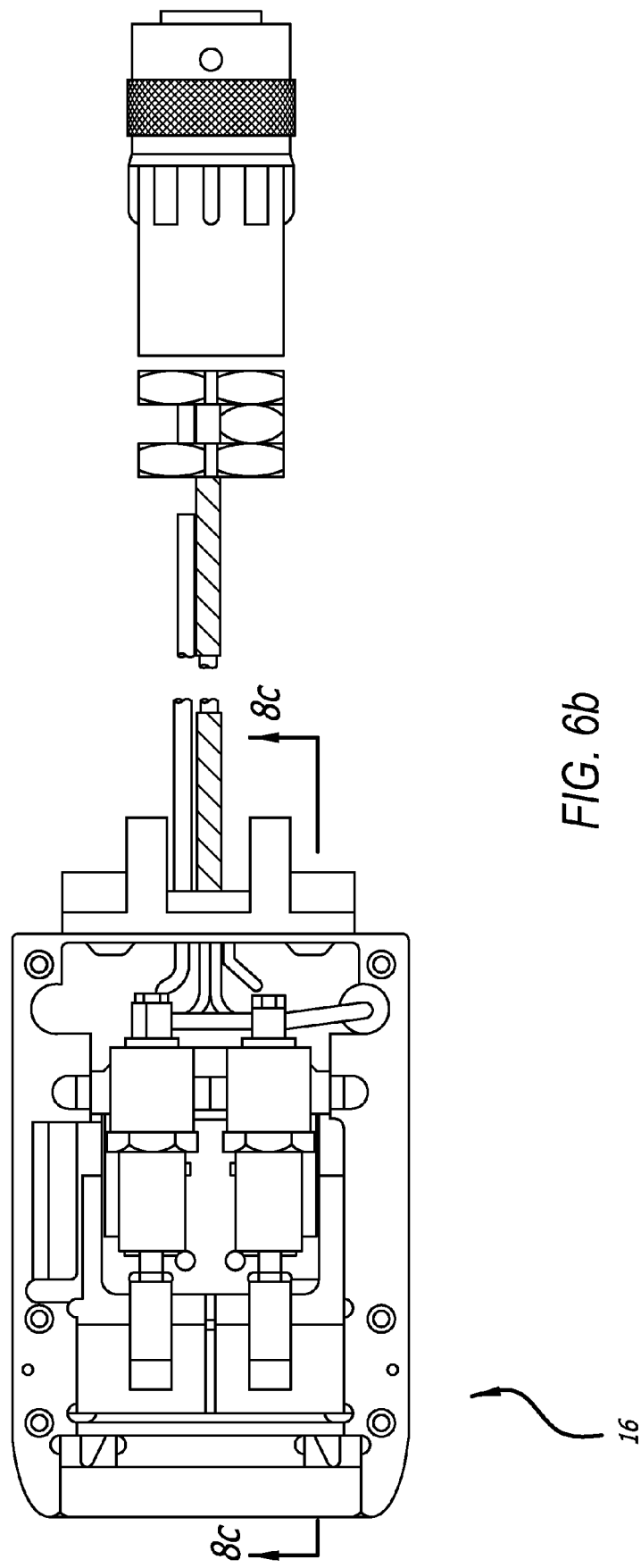
Figure 7A:
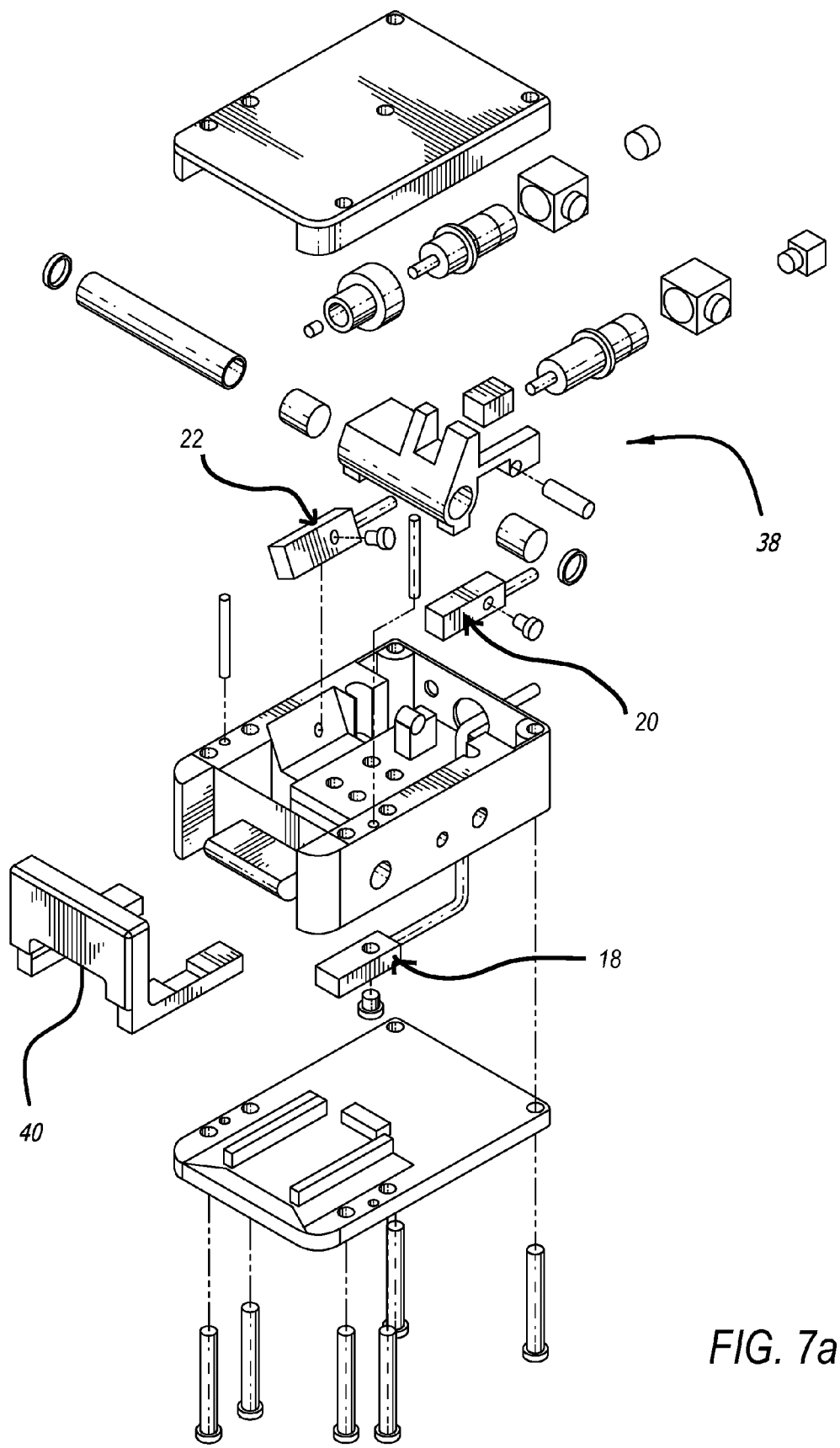
Figure 7B:
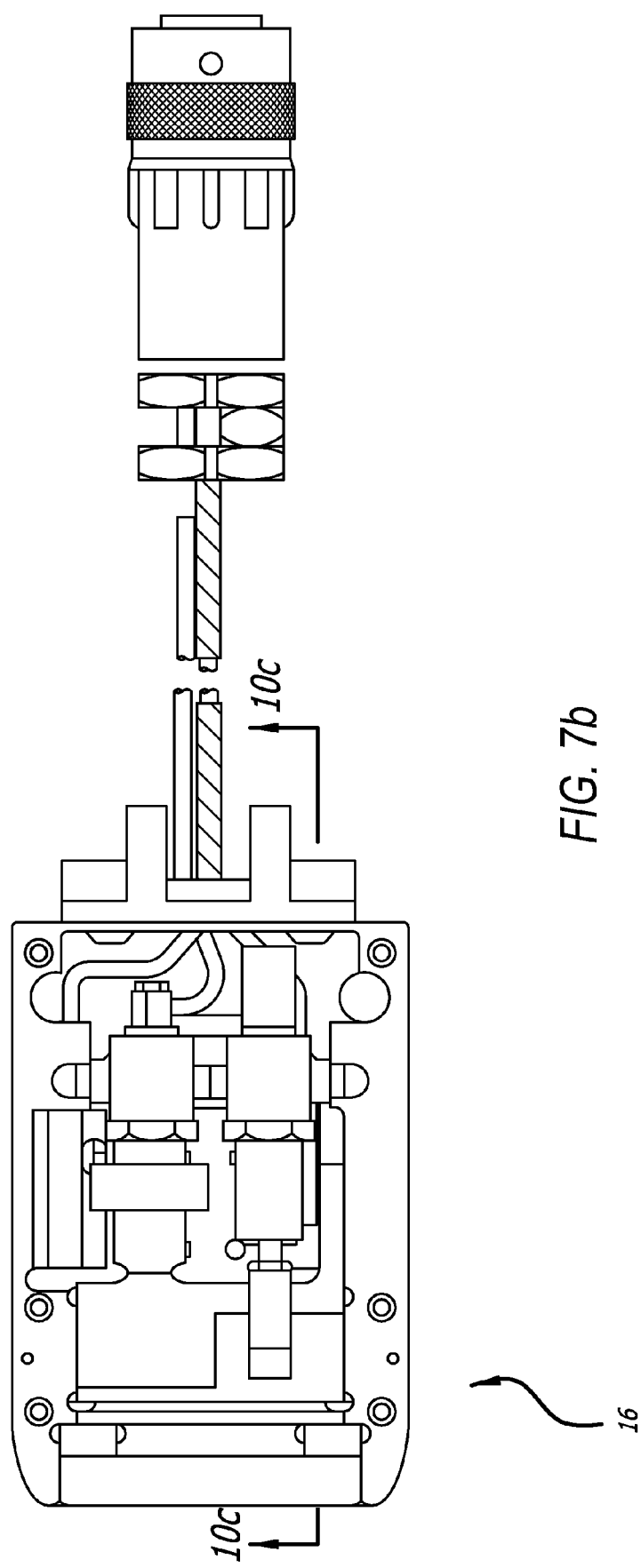

Turning now to illustrative example of FIG. 2, when a vehicle arrives and parks at a load/unload position, the VCS 26 turns on a seatbelt enable signal and turns off a lock signal. At this time, all receivers 16 are unlocked by the SBMS 24 and VCS 26. In this manner, each guest may then press the guest release button 40 on the receiver 16 which releases the tongue 12 whereby the seatbelt is free to be retracted by the retractor reel to allow the guest to unload from the vehicle. In particular, as each receiver 16 is unlatched, the corresponding retractors 14 will be unlocked allow the seatbelt to be extended for the next guest.

As guests are loaded into the vehicle, the guest extends the seatbelt and inserts the tongue 12 into the receiver 16. The status of the tongue 12 with respect to the receiver 16 is sensed by the system. Once all guests are seated, the operator may signal the system as to the desire to commence the ride, for example by causing the vehicle to advance. In response, the VCS 26 turns on the seatbelt lock command and the receivers 16 that already have a tongue 12 inserted will be locked by the SBMS 24, as are the corresponding lap retractors 14. All other receivers 16 and retractors 14 may remain unlocked until they have a tongue 12 inserted and are latched. As noted, the SBMS 24 monitors the transitions of the sensors to validate that they are operating correctly and to determine the status of the receiver 16. To validate the sensors, for example, it must be sensed that a tongue 12 was removed from and reinserted into the receiver 16 at least once between lock cycles. When the SBMS 24 determines that a receiver 16 has been properly latched and locked, a signal indicative of the status may be sent to the ODP for use in providing a locked status indicia to the ride operator. Thus, seats that have not been buckled or which do not have the tongue fully inserted will not have the appropriate indicia present thereby notifying the operator that guest assistance may be necessary. Similarly, the SBMS 24 may generate a signal indicative of a seatbelt fault condition, e.g., a determined sensor failure, that is sent to the ODP for use in providing a fault status indicia to the operator.

At this time, if a guest wishes to change seats or there is a problem with the seatbelt, the operator may use a manual seatbelt unlock switch 42 to unlock all seatbelts. The guest may then be instructed to release their seatbelt by pressing the seatbelt release button 40 to thereby allow the guest to relocate to a different seat and/or buckle their seatbelt again. Once the manual seatbelt unlock switch 40 is released, all seatbelts may again be locked.

At this time, the operator may dispatch the vehicle into the ride. However, if there is a fault within the system, the VCS 26 will inhibit motion. Otherwise the ride is dispatched and the VCS 26 turns off the seatbelt enable which, in turn, turns off the power used to release the retractors 14 and unlock the receivers 16—all receivers 16 and retractors 14 will thus become locked regardless of whether or not they are latched. The SBMS 24 may also generate a signal to turn off all seat status indicator elements 28 at this time.

Upon the return of the vehicle to the unload/load position, the VCS 26 turns on the seatbelt enable which turns off the power for the retractor and receiver locks and enables the status indicator elements 28. The VCS 26 also turns off the seatbelt lock command whereupon the SBMS 24 may unlock all receivers locks. As noted previously, the system may monitor the change in state of each sensor during unlocking to verify that the sensors are working properly. At seats that remain empty during the consecutive cycles, only the lock sensor will transition when the lock command is turned on and off.

During the ride, the receiver sensors may be further monitored for the purpose of providing feedback useful in determining vehicle status to thereby allow for further control of the operation of the ride.

As noted, a manual seatbelt unlock switch 42 (e.g., a two-position, spring return mushroom button) may be provided and monitored by the VCS 26. When a vehicle is first powered-up all the seatbelts are enabled and locked, meaning that they can be extended from the retractor 14 if they are not latched but become locked immediately upon becoming latched or upon initiation of motion. The manual seatbelt unlock switch 42 may thus be utilized to override the default state of the system, preferably provided that the vehicle is not moving.

To allow for the inspection of the lap belt retractors, a retractor test switch 44 may be provided. By way of, example, this test switch 44 may have three positions, namely, "Off," "A," and "B." In the "Off" position, the seatbelts operate normally and this position should be required for normal ride operation. In the "A" position, the locking pawl assemblies 32 controlled by the group lap retractor release valve are supplied air to unlock them. Simultaneously, the VCS 26 removes the seatbelt enable command to the SBMS 24 so that the individually controlled locking pawl assemblies 32 remain locked, i.e., this is the default response of the SBMS 24 when the enable is removed. This effectively causes one locking pawl assembly 32 on each retractor 14 to become locked and the other to become unlocked. In the "B" position, the VCS removes air from the ganged locking pawl assemblies 32, i.e., via control of the group lap retractor release valve, to lock the locking pawl assemblies 32 and supplies the seatbelt enable command to and removes the seatbelt lock command from the SBMS 24 so that the individually controlled locking pawl assemblies 32 are unlocked—this is the default response to the SBMS 24 when the enable is applied and the lock is removed. Thus, in the "B" position, the lap retractor locking pawl assemblies 32 assume the opposite state of test mode "A" and, in either the "A" or "B" test modes, only one side of the lap belt retractor 14 will be unlocked. In this manner, the retractor operation can be validated by manual inspection.

The retractor test modes may be activated when the vehicle is in a station area where the seatbelts would normally be unlocked or when the manual seatbelt unlock switch 42 is selected while the vehicle is stopped at any position on (or off) the ride track. At all other time, the retractor test switch 44 may be ignored and the seatbelt retractors 14 allowed to operate normally. Furthermore, a message may be generated by the VCS 26 if the test switch is determined to be in an invalid position. Still further, when either retractor test mode is active, the SBMS 24 will be in a state where the seat indicators elements 28 should not indicate a valid seatbelt, e.g., the will be in a state indicative of a fault or unlatched seatbelt.

For indicating the status of a seatbelt, the ODP may provide indicia in the form of visual and/or audio emissions that are representative of a status. By way of example, different colors, different sounds, different light emission patterns, etc. may be utilized to represent different statuses/ states of the seatbelt. In the illustrative example, the seatbelt indicator 28 utilizes two distinctive flashing rates to indicate a corresponding status. In this case, a fast flashing rate, e.g., 2.5 Hz, may be used to indicate that the seatbelt is latched and locked and all receiver sensors have transitioned since the seatbelt enable signal was turned on, i.e., that the corresponding seatbelt has been correctly latched and locked. Likewise, a slow flashing rate, e.g., 0.5 Hz, may be used to indicate that the seatbelt has a fault condition. A non-illuminated status element 28 may further be used to indicate that a seatbelt has not been latched. When a fault condition is signaled, the remaining seat status indicating elements 28 may be turned off so that only the faulted seatbelt will be called to the attention of the operator. Status conditions may also be provided to, for example, a handheld message display.

As will be further appreciated from the figures, the components can be configured for various different applications while retaining several common components. For example, the receiver may be provided with a single locking pawl assembly, as illustrated in FIGS. 5a–5d or with dual, pneumatic locking pawl assemblies, as illustrated in FIGS. 6a–6d and 7a–7d. When dual locking pawl assemblies are utilized, air may be supplied to the redundant locking pawl assembly of each receiver by individually controllable valves or by means of a single valve that is upstream of each of a ganged collection of locking pawl assemblies. Still further, as illustrated in FIGS. 6a–6e and 7a–7e, the use of dual, redundant locking pawl assemblies in the receiver may also require the use of dual CIP sensors 20 for providing feedback to the SBMS 24.

Thus has been described a fail-safe passenger restraint system. However, while specific examples have been described and illustrated in detail, it will be appreciated by those skilled in the art that various modifications and alternatives to those details could be developed in light of the overall teachings of the disclosure. For instance various well-known controllable locking mechanisms may be substituted for the pneumatically activatable locking pawl assemblies presented by way of example only. Accordingly, the particular arrangement disclosed is meant to be illustrative only and not limiting as to the scope of the invention which is to be given the full breadth of the appended claims and any equivalents thereof.

What is claimed is:

1. An amusement ride vehicle, comprising:
    a plurality of seats, each seat having a seatbelt, a refractor from which the seatbelt is extendable, and a receiver used to latch the seatbelt;
    wherein each refractor further comprises a first locking element and a second locking element each provided for limiting movement of the seatbelt; and
    wherein the first locking element of each refractor is individually controllable and wherein the second locking element of each refractor is arranged so as to be collectively controllable.

2. The amusement ride vehicle as recited in claim 1, wherein at least one of the first and second locking elements comprises a pneumatically controllable locking pawl assembly.

3. The amusement ride vehicle as recited in claim 1, wherein the first locking element comprises a pneumatically controllable locking element and the amusement ride vehicle comprises a plurality of valves each provided to controlling flow to one of the plurality of first locking elements of each of the plurality of refractors of each of the plurality of seats.

4. The amusement ride vehicle as recited in claim 1, wherein the second locking element comprises a pneumatically controllable locking element and the amusement ride vehicle comprises a single valve provided to control flow to each of the plurality of second locking elements of each of the plurality of refractors of each of the plurality of seats.

5. The amusement ride vehicle as recited in claim 1, wherein the refractor comprises a spring-loaded reel that engages the seatbelt and wherein the first and second locking elements are disposed on opposite sides of the spring-loaded reel.

6. The amusement ride vehicle as recited in claim 1, wherein the receiver comprises at least one sensor that determines a state of the seatbelt with respect to the receiver.

7. The amusement ride vehicle as recited in claim 6, comprising a plurality of status indicating elements that are activatable to present a representation of the state of a corresponding one of the plurality of seatbelts and receivers.

8. The amusement ride vehicle as recited in claim 7, wherein the representation is a visual representation.

9. The amusement ride vehicle as recited in claim 7, wherein the representation is an audio representation.

10. The amusement ride vehicle as recited in claim 7, wherein the states comprise a state selected from latched and locked.

11. The amusement ride vehicle as recited in claim 7, wherein the receiver locking element comprises a pneumatically controllable locking pawl assembly.

12. The amusement ride vehicle as recited in claim 1, wherein the receiver comprises at least one receiver locking element for locking the seatbelt within the receiver.

13. An amusement ride vehicle, comprising:
    a controller;
    a plurality of seats, each seat having a seatbelt, a retractor from which the seatbelt is extendable, and a receiver used to latch the seatbelt;

wherein each retractor further comprises a first pneumatic locking element and a second pneumatic locking element each provided for limiting movement of the seatbelt;

wherein each receiver is provided with a receiver pneumatic locking element provided for locking the seatbelt within the receiver;

a plurality of first valves under the control of the controller for supplying air to the first pneumatic locking element of a corresponding one of the plurality of retractors;

a second valve under the control of the controller for supplying air to each of the second pneumatic locking element of the plurality of retractors; and a plurality of third valves under the control of the controller for supplying air to the receiver pneumatic locking element of a corresponding one of the plurality of receivers.

14. The amusement ride vehicle as recited in claim 13, wherein at least one of the first and second pneumatic locking elements comprises a pneumatically controllable locking pawl assembly.

15. The amusement ride vehicle as recited in claim 13, wherein the retractor comprises a spring-loaded reel that engages the seatbelt and wherein the first and second pneumatic locking elements are disposed on opposite sides of the spring-loaded reel.

16. The amusement ride vehicle as recited in claim 13, wherein the receiver comprises at least one sensor that determines a state of the seatbelt with respect to the receiver.

17. The amusement ride vehicle as recited in claim 16, comprising a plurality of status indicating elements that are activatable to present a representation of the state of a corresponding one of the plurality of seatbelts and receivers.

18. The amusement ride vehicle as recited in claim 17, wherein the representation is a visual representation.

19. The amusement ride vehicle as recited in claim 17, wherein the representation is an audio representation.

20. The amusement ride vehicle as recited in claim 17, wherein the state is selected from the group consisting of latched, locked, unlatched, and unlocked.

21. The amusement ride vehicle as recited in claim 13, wherein the receiver pneumatic locking element comprises a pneumatically controllable locking pawl assembly.

* * * * *

UNITED STATES PATENT AND TRADEMARK OFFICE
CERTIFICATE OF CORRECTION

PATENT NO. : 7,166,032 B2
APPLICATION NO. : 10/979846
DATED : January 23, 2007
INVENTOR(S) : John Douglas Smith et al.

Page 1 of 1

It is certified that error appears in the above-identified patent and that said Letters Patent is hereby corrected as shown below:

Column 8

Line 10, "…a refractor" should read --a retractor--.
Line 13, "…each refractor further…" should read --each retractor further--.
Line 16, "…each refractor is" should read --each retractor is--.
Line 18, "…each refractor is…" should read --each retractor is--.
Line 30, "… of refractors of…" should read --of retractors of--.
Line 38, "…the refractor comprises…" should read --the retractor comprises--.

Signed and Sealed this

Twenty-ninth Day of May, 2007

JON W. DUDAS
*Director of the United States Patent and Trademark Office*